United States Patent
Aslot et al.

(10) Patent No.: US 8,984,240 B2
(45) Date of Patent: Mar. 17, 2015

(54) REDUCING PAGE FAULTS IN HOST OS FOLLOWING A LIVE PARTITION MOBILITY EVENT

(75) Inventors: Vishal C. Aslot, Austin, TX (US); Adekunle Bello, Austin, TX (US); Brian W. Hart, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 13/599,557

(22) Filed: Aug. 30, 2012

(65) Prior Publication Data

US 2014/0068207 A1    Mar. 6, 2014

(51) Int. Cl.
G06F 13/00 (2006.01)
G06F 12/12 (2006.01)
G06F 11/14 (2006.01)

(52) U.S. Cl.
CPC ............... *G06F 12/12* (2013.01); *G06F 11/14* (2013.01)
USPC .............. 711/160; 711/E12.071; 711/158; 711/159; 711/161; 711/162

(58) Field of Classification Search
CPC .................. G06F 12/12; G06F 11/14
USPC ......... 711/158, 159, 160, 161, 162, 170, 171, 711/172, 173; 707/219; 999.003
See application file for complete search history.

(56) References Cited

U.S. PATENT DOCUMENTS

| | | | |
|---|---|---|---|
| 6,330,653 B1 | 12/2001 | Murray et al. | |
| 7,966,651 B2 | 6/2011 | Miao | |
| 8,019,962 B2 | 9/2011 | Armstrong et al. | |
| 8,171,236 B2 | 5/2012 | Jacobs et al. | |
| 2007/0067366 A1* | 3/2007 | Landis | 707/205 |
| 2008/0235482 A1* | 9/2008 | Armstrong et al. | 711/173 |
| 2010/0205252 A1 | 8/2010 | Dorai et al. | |
| 2011/0099318 A1 | 4/2011 | Hudzia et al. | |
| 2011/0219169 A1* | 9/2011 | Zhang et al. | 711/103 |
| 2012/0030407 A1 | 2/2012 | Pandey et al. | |
| 2012/0036214 A1 | 2/2012 | Pafumi et al. | |
| 2013/0036280 A1* | 2/2013 | Futawatari et al. | 711/162 |

OTHER PUBLICATIONS

Bailey; "IBM PowerVM Live Partition Mobility"; IBM Redbook SG24-7460-01, Mar. 2009, retrieved from ibm.com/redbooks.

(Continued)

*Primary Examiner* — Arpan P. Savla
*Assistant Examiner* — Shane Woolwine
(74) *Attorney, Agent, or Firm* — Robert H. Frantz; Damion Josephs; David A. Mims, Jr.

(57) ABSTRACT

Page faults during partition migration from a source computing system to a destination computing system are reduced by assigning each page used by a process as being hot or cold according to their frequency of use by the process. During a live partition migration, the cold or coldest (least frequently used) pages are copied to the destination server first, followed copying the warmer (less frequently used) and concluded by copying the hottest (most frequently used) pages. After all dirtied pages have been refreshed, cutover from the instance on the source server to the destination server is made. By transferring the warm and hot pages last (or later) in the migration process, the number of dirtied pages is reduced, thereby reducing page faults subsequent to the cutover.

12 Claims, 12 Drawing Sheets

(56) References Cited

OTHER PUBLICATIONS

Networkcomputing;"IBM Pulse 2012: A New Storage Hypervisor"; retrieved on Aug. 15, 2012 from http://www.networkcomputing.com/storage-networking-management/ibm-....1.

IBM; "IBM i Technology Updates"; retrieved on Aug. 15, 2012 from https://www.ibm.com/developerworks/mydeveloperworks/wikis/home/wi?lang=en.

IBM;"Live Partition Mobility"; retrieved on Aug. 15, 2012 from http://pic.dhe.ibm.com/infocenter/aix/v6r1/topic/com.ibm.aix.powerha.a.

IBM; "Integrated Virtualization Manager on IBM System p5", retrieved on Aug. 28, 2012 from http://www.redbooks.ibm.com/redpapers/pdfs/redp4061.pdf.

\* cited by examiner

REDUCING PAGE FAULTS IN HOST OS FOLLOWING A LIVE PARTITION MOBILITY EVENT

FIELD OF THE INVENTION

The invention generally relates to systems and methods for dynamically managing data storage and in particular for the management of pages of data which may be moved or relocated during their use by one or more computer programs.

BACKGROUND OF INVENTION

Information provided in the following paragraphs is for background understanding only, and should not be taken as a disclaimer as prior art to the present invention unless specifically denoted as such. Information contained in this section of this patent application may be considered part of other inventions of the current assignee, inventors, or both assignee and inventors. As such, only diagrams and text which are indicated as prior art should be understood to be a disclaimer from the invention.

"Partition mobility" is a term which refers to the ability of a computing system to relocate the data content of logical partitions within a plurality of computer readable memory devices while one or more programs or processes may be using the data in those pages. In some scenarios, the logical partitions are relocated from one physical memory device (e.g. RAM devices, hard drives, cache devices, etc.) to another physical memory device within the same server computer system. In other scenarios, however, the migration involves moving the logical partition from the hardware of a first computer server system to second computer server system, such as when it's associated owner process is moved from one server to another server.

Live Partition Mobility (LPM)™ is a component option of the International Business Machines' (IBM) AIX™ operating system which, within a matter of a few seconds, can migrate entire system environment for a process being executed, including the state of the microprocessor the contents of memory any attached virtual devices and all connected users quickly and accurately.

In particular, live partition mobility is another step towards IBM's total virtualization continuum. This feature can be combined with other features of IBM's virtualization technologies including light workload partitions, the San volume controller, and others in order to provide full virtualization of computing platforms with a dynamic degree of flexibility to meet today's on demand computing requirements.

LPM can be used to migrate entire partitions and hosted applications from one hardware computing server to another computing server with minimal or no disruption to the services and loads they are handling. This allows even the most stringent of service level agreements to be met. In other applications or usages of LPM, load balancing can be achieved across multiple computing systems by performing necessary migrations of instances of application programs and their associated logical partitions. And administrators may use LPM to assist in periodic maintenance of existing computer systems as well as bringing online expansion of computing infrastructure capabilities.

And, conversely, system administrators may use LPM to consolidate applications and their data pages onto fewer application servers in order to free up hardware for other uses. Such consolidation efforts may also be used to minimize power consumption during low load conditions.

Partitions may exist in one of two states—powered off (inactive), or providing service (active). As one might expect, inactive partitions may be migrated with relatively less complexity than migration of active partitions. However, partitions which are active such as partitions being used by a running database program can also be migrated in a live production environment during normal user activities with no loss of data or loss of connectivity to the database or its data, and no effect on any executing transactions as they occur. And, migrations can occur between any supporting platform such as many of the IBM AIX computing systems.

SUMMARY OF EXEMPLARY EMBODIMENTS OF THE INVENTION

Page faults during partition migration from a source computing system to a destination computing system are reduced by assigning each page in the page as being hot or cold according to their frequency of use by the process. During a live partition migration, the cold or coldest (least frequently used) pages are copied to the destination server first, followed copying the warmer (less frequently used) and concluded by copying the hottest (most frequently used) pages. After all dirtied pages have been refreshed, cutover from the instance on the source server to the destination server is made. By transferring the warm and hot pages last (or later) in the migration process, the number of dirtied pages is reduced, thereby reducing page faults subsequent to the cutover.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
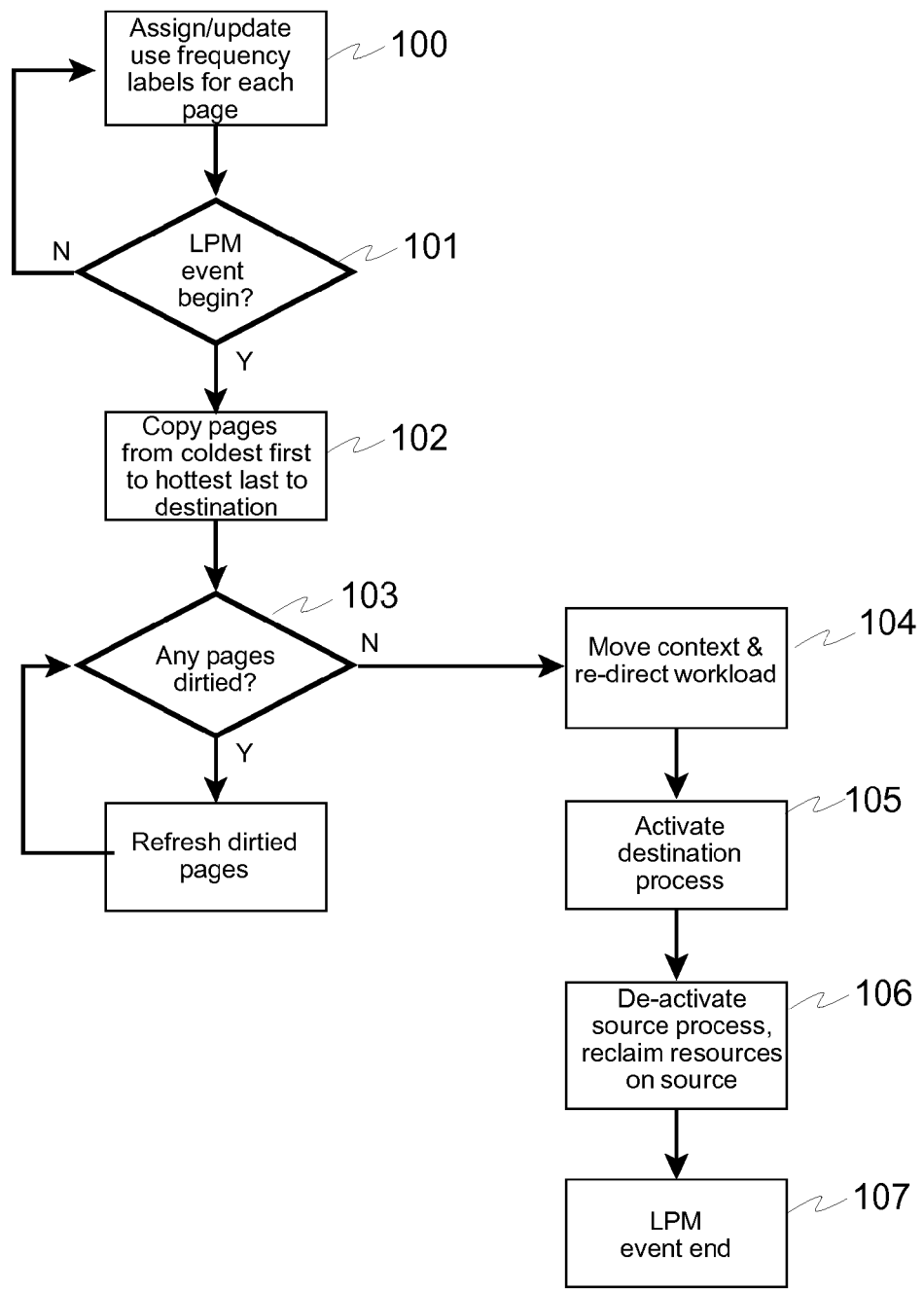
FIG. 1 depicts an exemplary logical process according to the present invention.

The inventors of the present and the related invention have recognized problems not yet recognized by those skilled in the relevant arts, as described in the foregoing and in the following paragraphs and review of the available state of the existing art.

For the reader's convenience publications such as IBM PowerVM Live Partition Mobility published by IBM in their Redbook series by John E. Bailey et al., document number SG24-7460-01, may be useful to understand functionality of systems to which embodiments of the present invention may be found applicable. Those skilled in the relevant art will readily recognize that other embodiments of the present invention may be useful and beneficial to other computing platforms which provide similar functionality to the IBM platforms which will be used in the following illustrative examples. As such, the scope of the present invention should not be determined solely from the exemplary embodiments described herein but should be determined from the claims attached hereto.

The present inventors have determined that during a Live Partition Mobility (LPM) event, it is desirable that all of the virtual machine's (VM's) real memory is to be transferred to the destination computing system. For the purposes of this disclosure, we will refer to VM's, logical partitions (LPAR) and partitions synonymously. The memory constructs including the contents of those constructs is to be transferred in pages and is transferred from the lowest to the highest page.

Some pages however may be used or modified during the window of time in which the page is being relocated from the first computing system hardware to the second computing system hardware. Such pages are referred to as being "dirty". The current LPM processes address this issue by correcting the dirty content of the pages until the page is successfully transferred without changes between the source page and the destination page. At some point in the process when some overall percentage of the pages have been transferred, the CPU context is also saved on the source system and then it is transferred to and reinstated on the target system. In the present state of the art, memory is transferred sequentially from the lowest page number to the highest without regard to the frequency of use. At this point, the application instance which was running on the source computing system, and application instance is started on the destination computing system, whereby all traffic and connectivity to that instance is also transferred from the source instance of the process. In a general sense, this transfers and migrates application instance from the first computing system hardware to the second computing system hardware. Actual details of such a transfer are quite involved, so this generalized description is provided for the convenience of the reader.

The present inventors have determined that a drawback of this process is that it can result in the operating system (OS) suffering page faults when it is resumed on the target system. From the transferred OS's point of view, the pages that were never transferred (or that were dirtied after transfer and not yet we transferred) have effectively immediately become "paged out". In such a situation, threads of execution that reference these pages will have to be stalled (execution suspended) until the dirtied page can be fetched from the source computing system. This problem can be exacerbated by the fact that the dirtied pages that are likely to be needed soon after the transfer are often the same pages that were in use and likely dirtied just before the transfer occurred.

In the process of making the present invention, the inventors considered several existing approaches and product features which were thought to potentially reduce or eliminate this problem, but found each of them lacking in one or more substantial manners. For example, one particular publicly-disclosed method for improving memory locality of virtual machines intends to improve the affinity of memory pages following a migration of a virtual machine (VM) to another non-uniform memory architecture (NUMA) computing system node. However, this is not the same as addressing the goal to reduce the number of page faults on the destination getting system. The affinity of memory pages will most likely be completely different on the destination computing system. This method identifies "hot" pages on-the-fly on the destination NUMA node, and pulls them from the old NUMA computing node. The present inventors have discovered, however, that what is actually needed to address the present problem is to determine "hot" pages on the source computing rather than on the destination computing system, preferably via a proactive mechanism and uses that information at the time of partition migration.

According to a second particular publicly disclosed method for leveraging memory similarity during live partition migrations, it is decided if a certain memory page on the destination computer system needs to be retransferred. According to the second publicly-disclosed approach, this is done by maintaining a cache of fingerprints of certain candidate pages and then by comparing a candidate page's fingerprint on the source computing system to that on the destination computing system. If the fingerprint has changed, this process determines that the page needs to be retransferred. Embodiments according to the present invention however, differ significantly in at least two ways from the second publicly disclosed method. First, no fingerprint cache is maintained or required and no comparison of fingerprints must be performed in order to achieve the objectives of the present invention. Instead, any reasonable method (e.g. mod-bits) to decide that a page is dirty suffices for embodiments according to the present invention. Secondly, the second publicly-disclosed method is directed towards specifically handling dirty pages, whereas embodiments according to the present invention intelligently decide not only the order within 'read-only' and 'read-write' pages but also between them.

Yet a third publicly-disclosed method for optimizing migration policy during live virtual Emory migration sets forth an elaborate method to control the migration of a VM from one computing system to another computing system. This third publicly disclosed method purports to control the order in which pages are transferred but also when the cut-over takes place, by re-computing which page should be transferred next and whether to cut-over at every "tick". Embodiments according to the present invention far simpler than this third publicly disclosed method, whereas classifying pages into broad classes and doing a transfer based on the class is avoided and whereas "when" the cut-over happens is not modified or delayed.

Embodiments according to the present invention provide a method to select an order of transfer of pages from the source computing system to a target computing system and a different approach than presently provided by existing LPM systems. Information regarding the frequency and type of access for which each page or partition is used to determine an order of transfer for the pages which is intended to reduce the number of page faults that are suffered after the migration cutover.

Methods and processes according to the present invention will include some or all of his following steps or phases:

1. While the workload is running on the source system, the OS will run a new daemon that periodically selects "hot" pages in the partition. In this context, "hot" is referring to pages which are being used most often or most recently. For example, in one embodiment according to the present invention complements the well-known least recently used (LRU) page replacement daemon in which the page replacement daemon looks for "cold" pages to steal. Here, a similar daemon, but operating on a opposite principle, would scan for "hot" pages which are determined to be most recently used (MRU) or most frequently used (MFU) by one or more computing processes.

2. Other processes and/or hardware functions may provide a hint to the MRU daemon about each "hot" page. This causes the daemon to remember which real pages are "hot" so that it may transfer them first or with higher priority during an LPM event.

3. Similarly, the other processes and/or hardware functions may clear the "hot" page hints to the migration hypervisor for the real pages that were previously considered "hot" but are no longer considered so. This additional function ensures that only the most recently determined set of "hot" pages are transferred first or with highest priority.

4. During an LPM event, the migration hypervisor continuously or periodically scans memory looking for "hot" pages and transfers them first or with highest priority.

5. During an LPM event, after all the "hot" or highest priority pages are transferred from the first computing system to the second computing system, the remainder of the pages associated with a process being migrated can then be transferred in some further order.

Additional and optional aspects of embodiments according to the present invention include:

6. In a variation of the embodiments described in the foregoing paragraphs, the other processes and/or hardware functions may clear the "hot" page hints, and the pages that are no longer "hot" may be demoted to "warm" status by the other processes and/or hardware functions. This embodiment variation includes an additional hint to the MRU daemon. If "warm" pages are not referenced on the next scan, they may then be demoted to "cold" status and all hints may be cleared from the migration hypervisor daemon. During an LPM event, the migration hypervisor may first transfer all "hot" pages in a first pass, and during a second pass, it may transfer the "warm" pages. And then on a third pass, it may transfer "cold" pages in some order.

7. The set of "hot" pages may be further divided into pages that are sustaining mostly just references (read operations) versus updates (write operations). The present inventors have recognized that it is wasteful to transfer pages that are undergoing a very high frequency of writes because the pages will likely be dirtied again (and so need be re-transferred) before the migration process cut-over. During an LPM event, the migration hypervisor may transfer "hot-n-read-only" pages first followed by "warm-n-read-only" followed by "cold-n-read-only" pages. Next it may transfer "cold-n-read-write" pages followed by "warm-n-read-write" pages followed by transferring the "hot-n-read-write" pages. This transfer prioritization schema ensures that "hot" pages that are most likely to be dirtied (i.e. written to) before cutover don't have to be transferred over and over again (or at least must be retransferred a reduced number of times). Meanwhile, the hot-n-read-write pages needed by the workload on the target system may receive them as needed.

8. For embodiments in which the underlying operating system groups pages into larger structures (e.g. segments), the page transfer order will priority schema may take in account such larger structure organization of the pages rather than transferring structures at the page level. For example, the migration hypervisor may track which segments instead of pages are hot and move those entire segments before the colder segments, etc. In such embodiments, the page transfer ordering mechanism would work similarly to those processes previously described herein except that references to pages would refer to the larger structures such as segments. It may also be possible to track hot, warm, and cold hints for the logical memory blocks (LMB). An LMB is the smallest unit of real memory assigned to a VM by the hypervisor.

Referring now to FIG. 1, the use frequency levels such as hot, cold and warm are assigned to each page periodically (100). When an LPM event begins (101), the pages are copied starting with the coldest first and ending with the hottest last (102) from the source server to the destination server.

After all the pages have been copied, a check is made to determine if any of the pages have been dirtied or modified (103) since they were copied. If any have been, they are refreshed on this destination server. Refreshing a page can take the form of copying it completely again, or only updating the portions of it which have been modified on the source server since the previous copy was made. For example, relational database files lend themselves particularly well to doing only updates to the portion of their content which has been changed in a particular time frame. Other files however maybe more expeditiously handled by completely re-copying them.

After all page have been successfully copied without any of them being dirtied, the context of the processor on the source computing system for the process being migrated is copied to the processor on the destination computing system and the process is activated (104, 105). Workload is also properly redirected such that any continuing transactions are being handled by the process on the destination computing system, and such that any new transactions with the process are started with the instance of the process running on the destination computing system rather than the process running on the source computing system. Eventually, the source process is deactivated (106) and the resources on the source computing system may be reclaimed and used for other processes. This concludes the live partition migration event (107). As one may imagine, the same process now begins for the process which is executing on the destination computer which now is taken from the perspective of a new source computer if it is to be migrated again.

Figure 2:
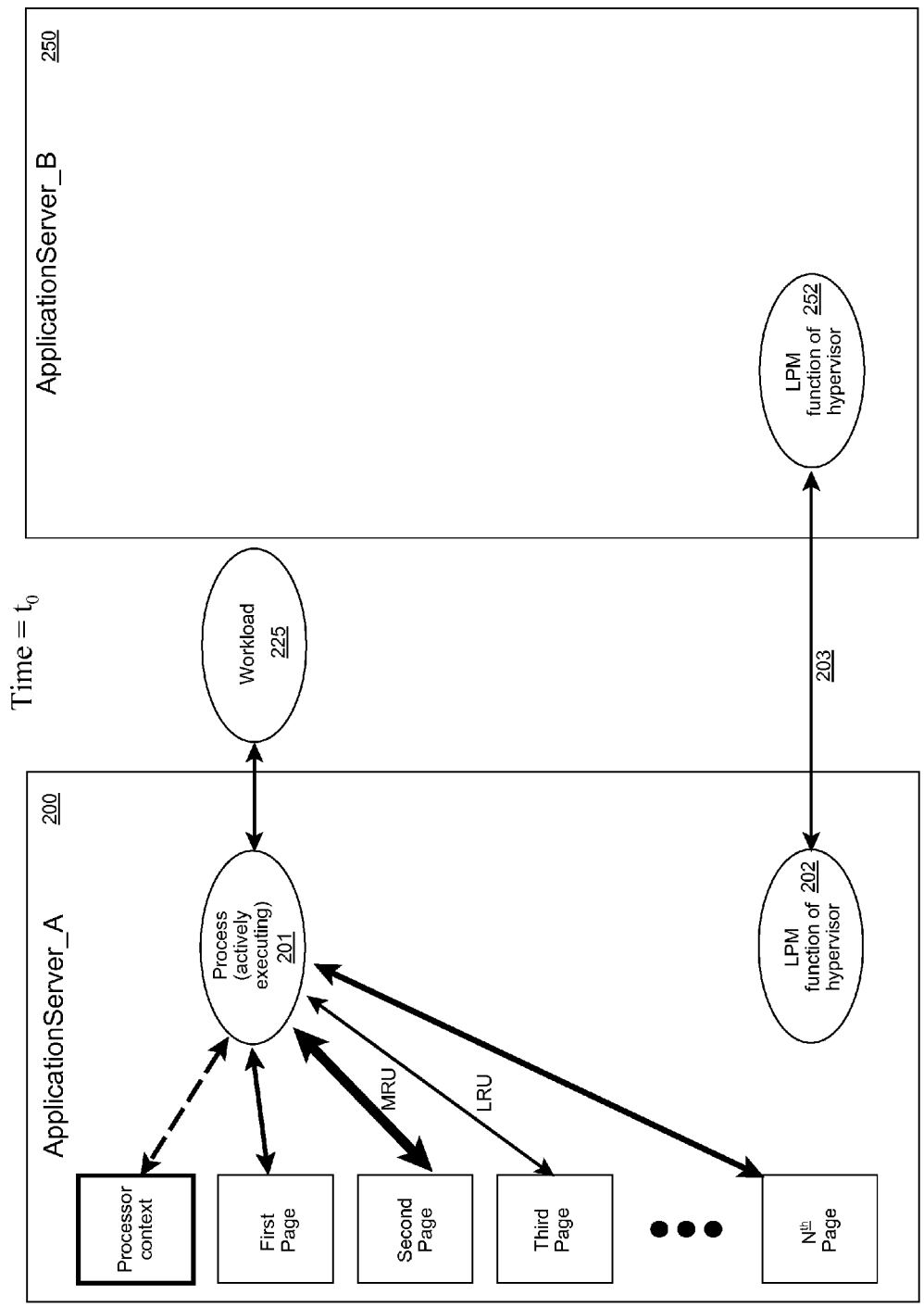
FIG. 2 illustrates a state of two application servers prior to the beginning of a live partition migration.

Referring now to FIG. 2, two application servers (200, 250) are shown. Each has a cooperating LPM function of the hypervisor as previously described (202). In this example, the source application server (200) is acting as the source computing platform from which a process (201) will be migrated to a destination application server (250). At this first time equals zero, the process which is actively executing (201) is interacting with a workload (225) having a context of the process and a plurality of pages as shown. In this diagram the thicker double headed arrow lines indicate more frequent usage or interaction with a page. The second partition is the most recently used page as indicated by the thickest double headed arrow line. The first page and the $N^{th}$ page are moderately often accessed by the process, and the third page is shown as the least recently used partition.

Figure 3:
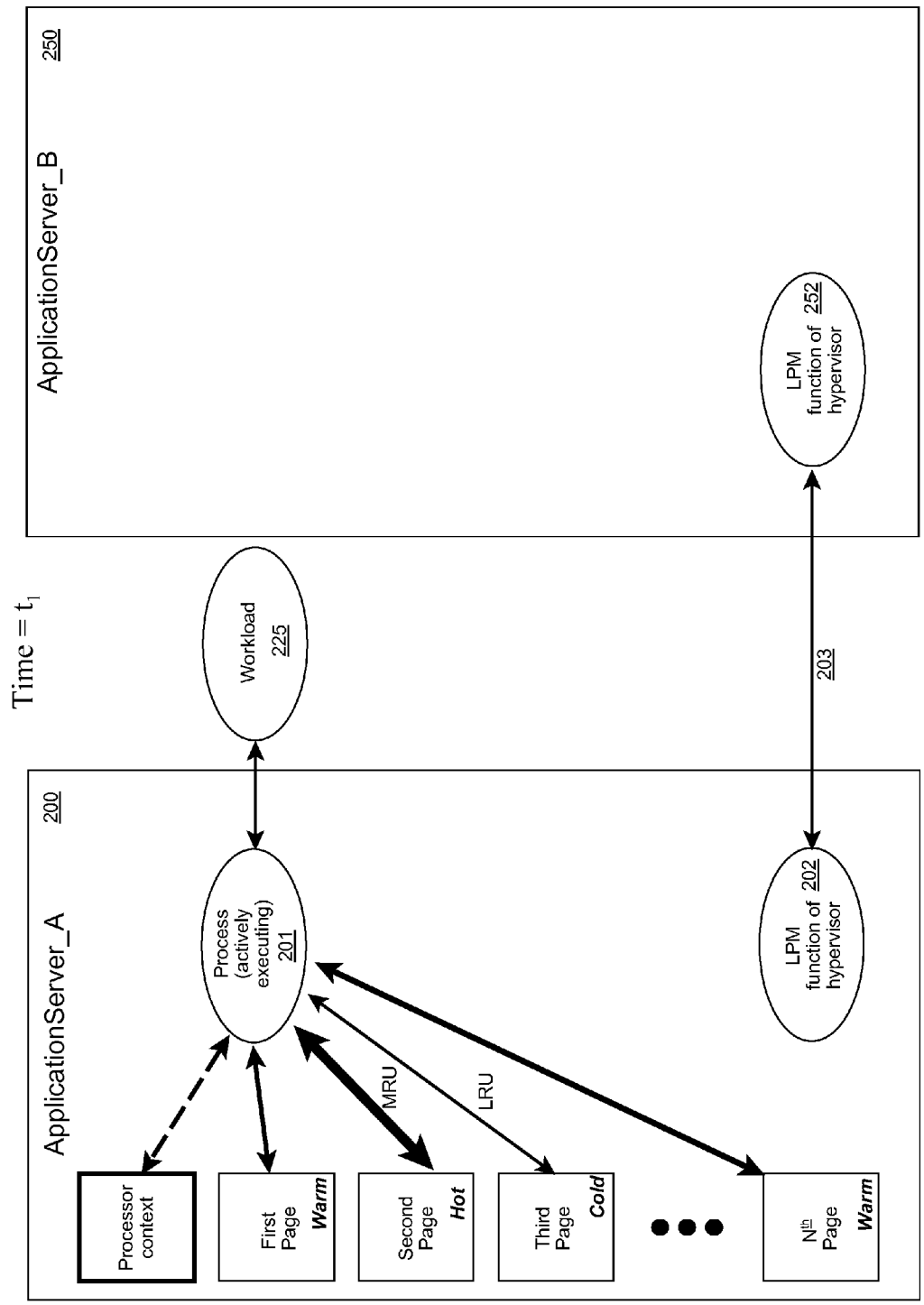
FIG. 3 shows the designation of the pages according to their frequency of use by the process on the source server.

Referring now to FIG. 3, in which time is incremented to T=1, the LPM function of the hypervisor (202) of the source server (200) has analyzed the pages and designated each page as either hot, warm, or cold. These designations are determined as previously described. And, until an LPM event begins, these designations will be periodically updated by the LPM function of the hypervisor accordingly.

Figure 4:
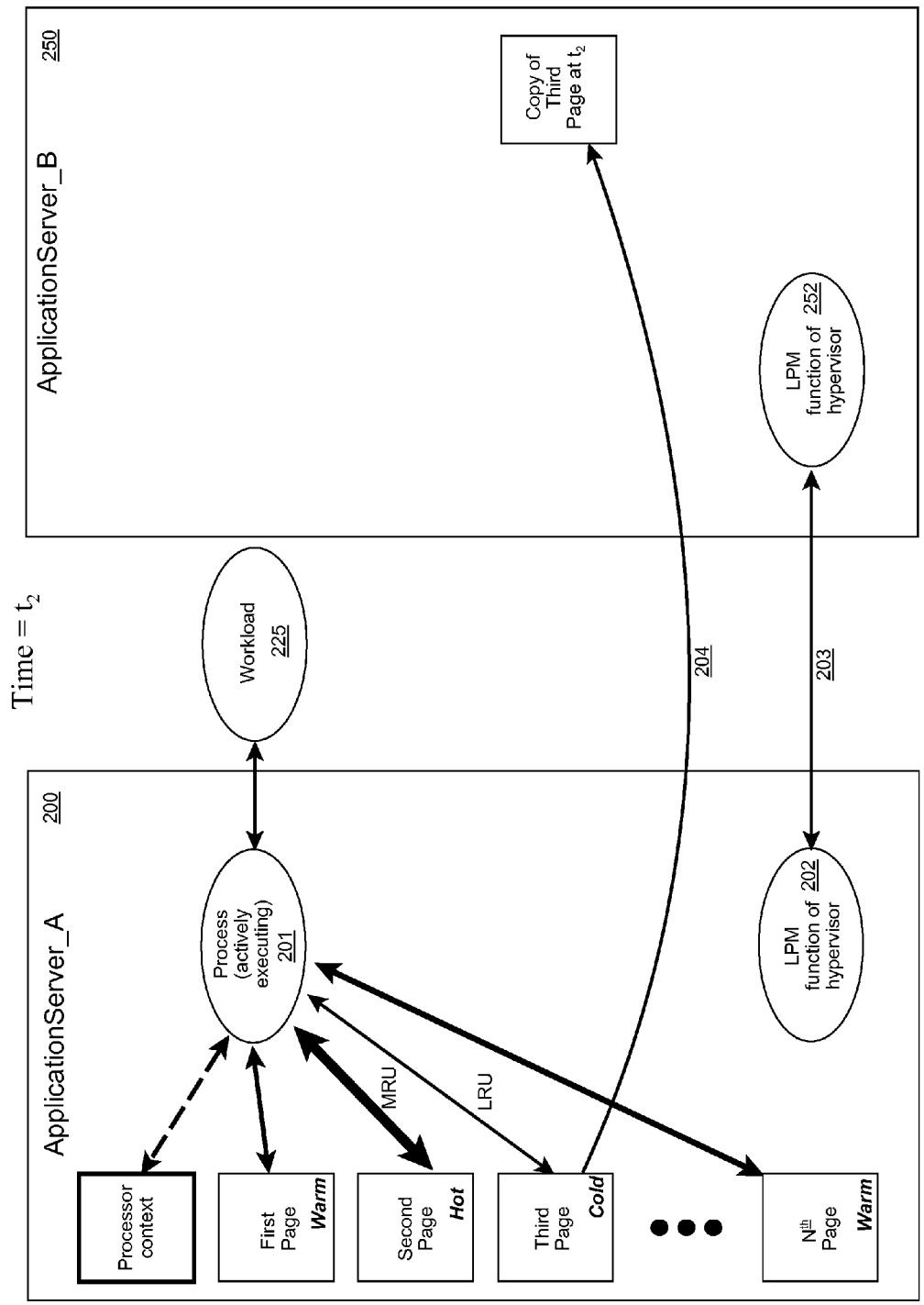
FIG. 4 illustrates the copying of the cold or coldest pages to the destination server first (or earliest).

In FIG. 4, an LPM event has begun at time T=2. The LPM functions of the hypervisors (202, 252) coordinate and communicate (203) in order to copy (204) the coldest pages from the source server (200) to the destination server (250). The coldest pages are copied first because they will be the oldest at the time when the workload is transferred from the first server to the second server and thus they are the least likely to have been dirtied by the process executing on the first server during the period of migration.

Figure 5:
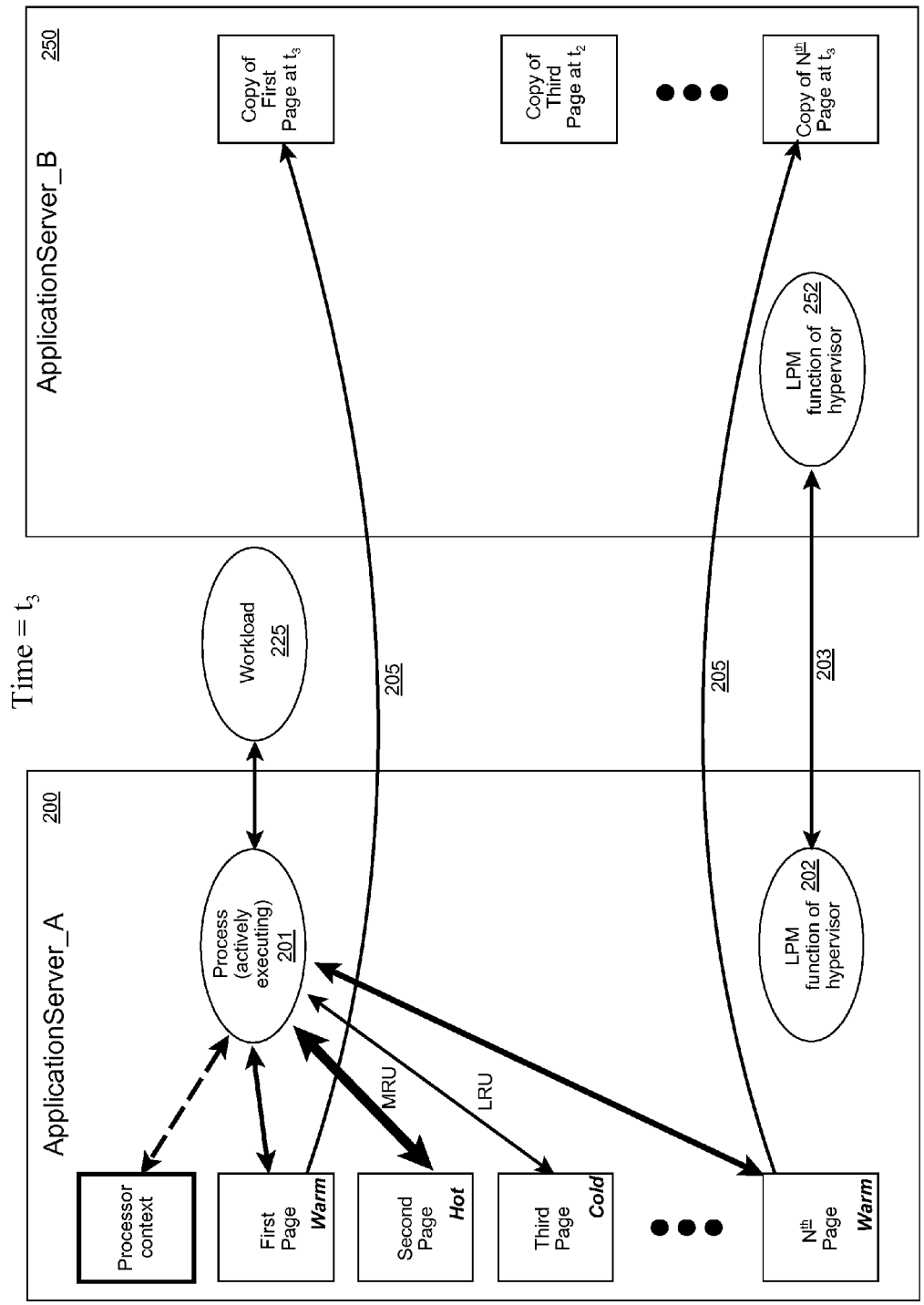
FIG. 5 shows copying of the warmer pages after the colder pages.
Figure 6:
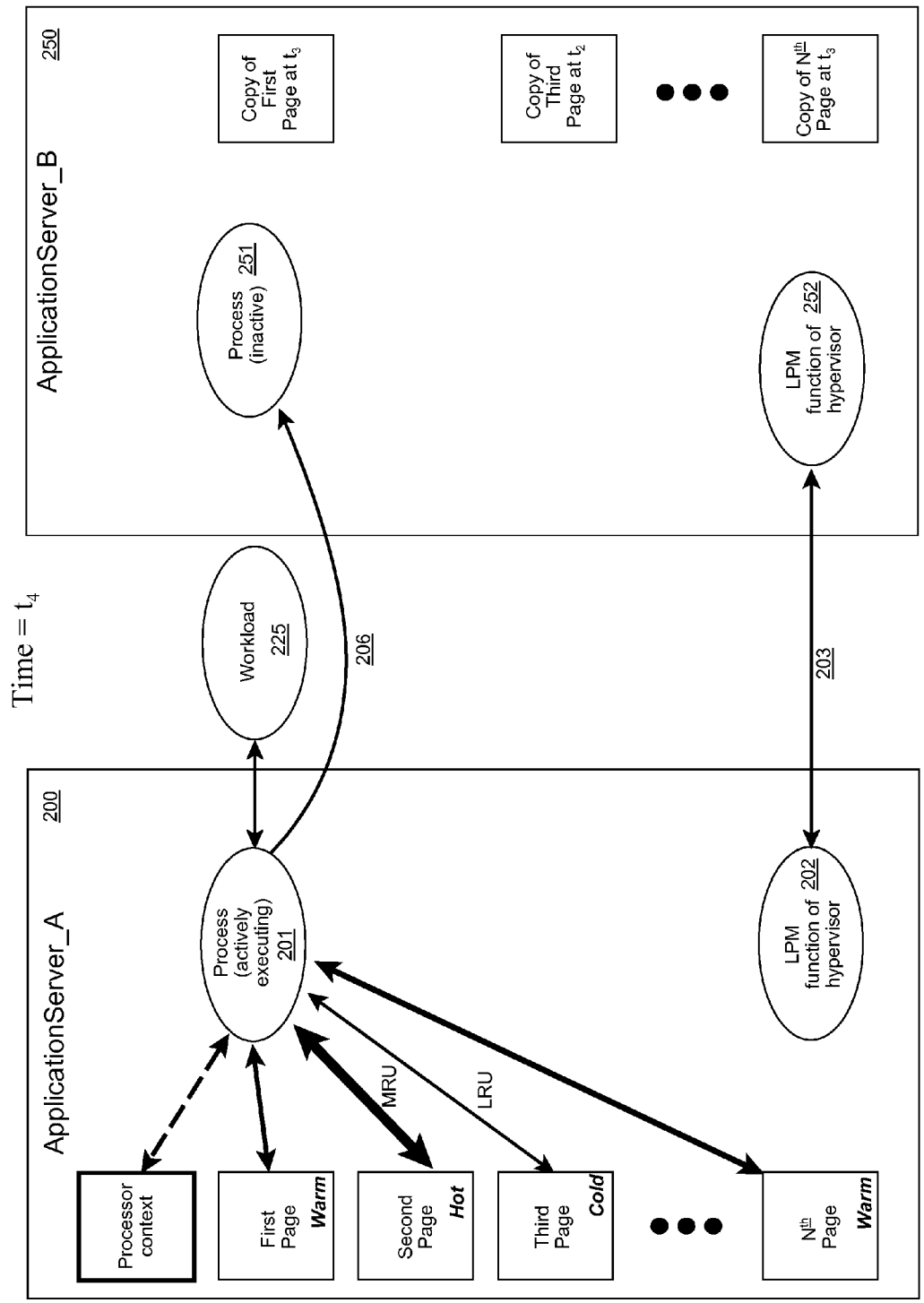
FIG. 6 illustrates copying of the process itself to the destination server.

Turning now to FIG. 5, which time is incremented to T=3, the LPM functions of the hypervisors are continuing to perform copying of the least cold or warm pages (205). In this example, the first page and the $N^{th}$ page are currently designated as warm and so they are copied next. And continuing to FIG. 6, the LPM functions of the hypervisors make (206) a copy (251) of the process (201) from the source server to the destination server if it does not already exist on the destination server, all the while the workload (225) continues to be handled by the process (201) executing on the source server (200).

Figure 7:
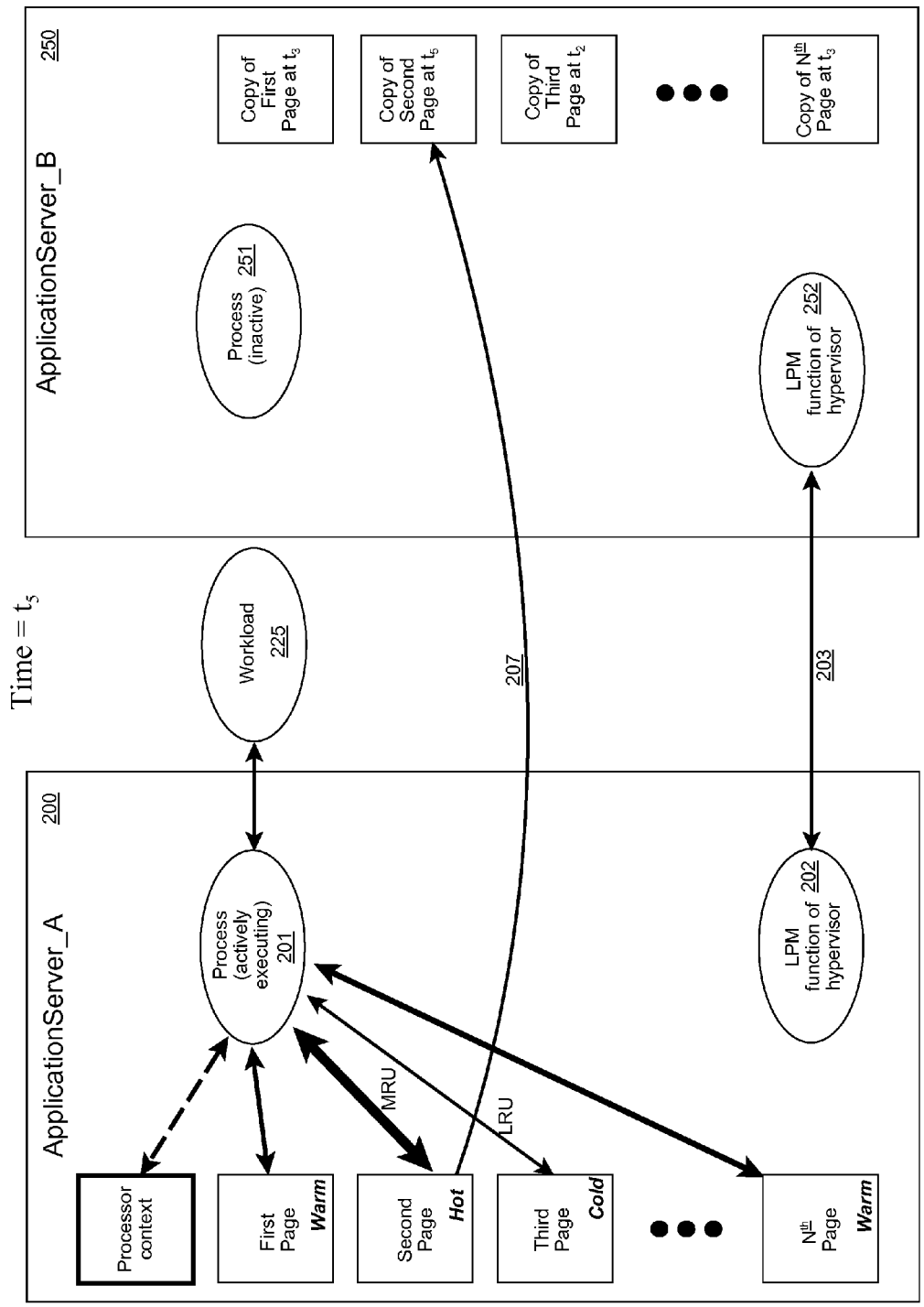
FIG. 7 depicts the copying of the hottest or most frequently used pages to the destination server last.
Figure 8:
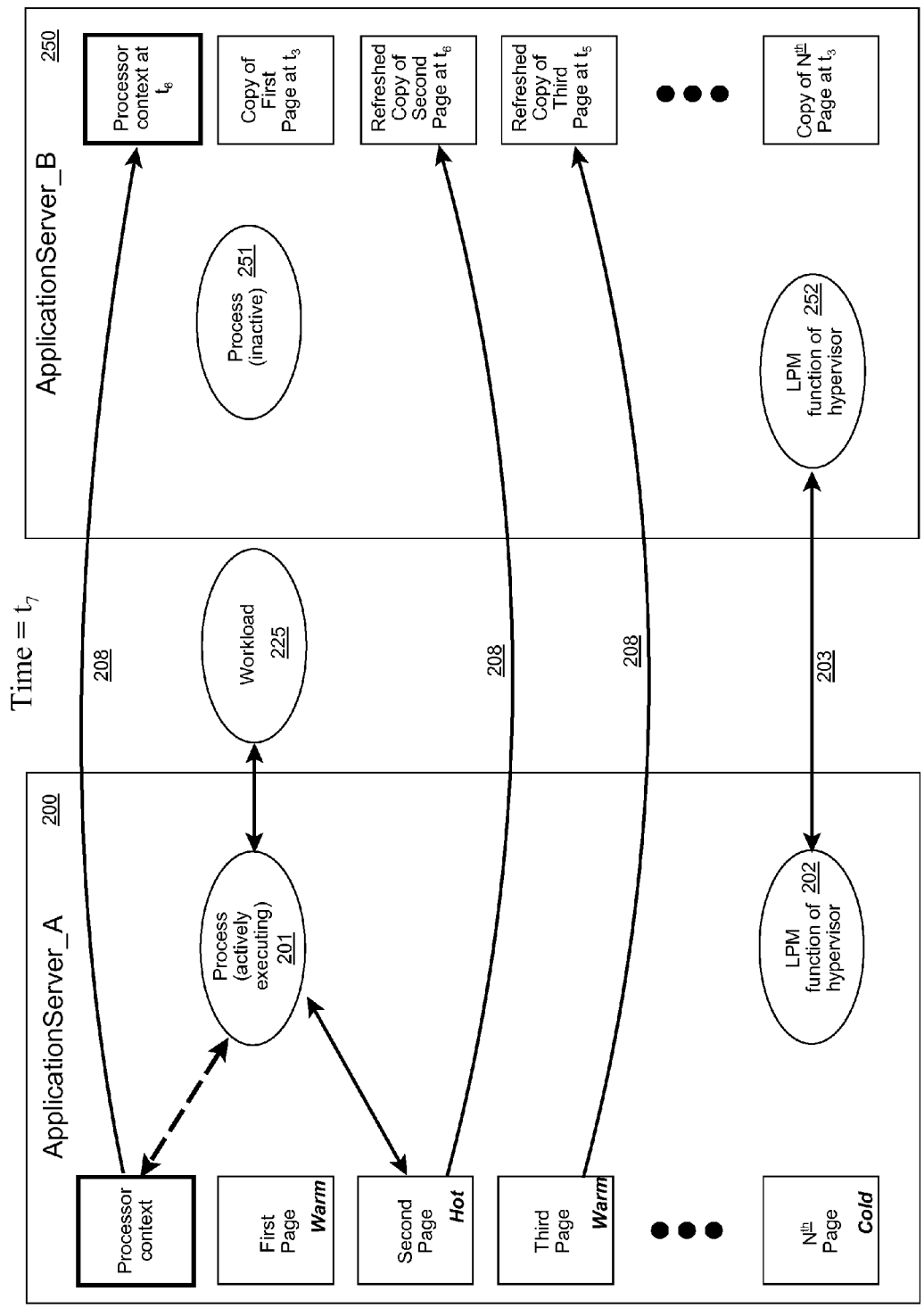
FIG. 8 shows refreshing of any partitions which were dirtied on the source server during the early phases of migration, and the copying of the process context to the destination server.

Continuing with this example to FIG. 7, the hottest pages such as the second page in this scenario are copied (207) from the source server to the destination server an LPM functions of the hypervisors while the workload continues to be handled by the process executing on the source server. Now it appear that at least an initial copy of each of the pages and the process itself have been made on the destination server and potentially the migration is ready for cutover. However in this scenario the illustration includes in FIG. 8 the situation where the second and third pages have been modified or "dirtied" since their initial copies were made to the destination server. As such the LPM function of the hypervisors will refresh the destination copies of the second and third pages (208). And, another check of each page on the source server is made to make sure that no further changes have been made to any of the copy pages since a last copy of each has been made.

Figure 9:
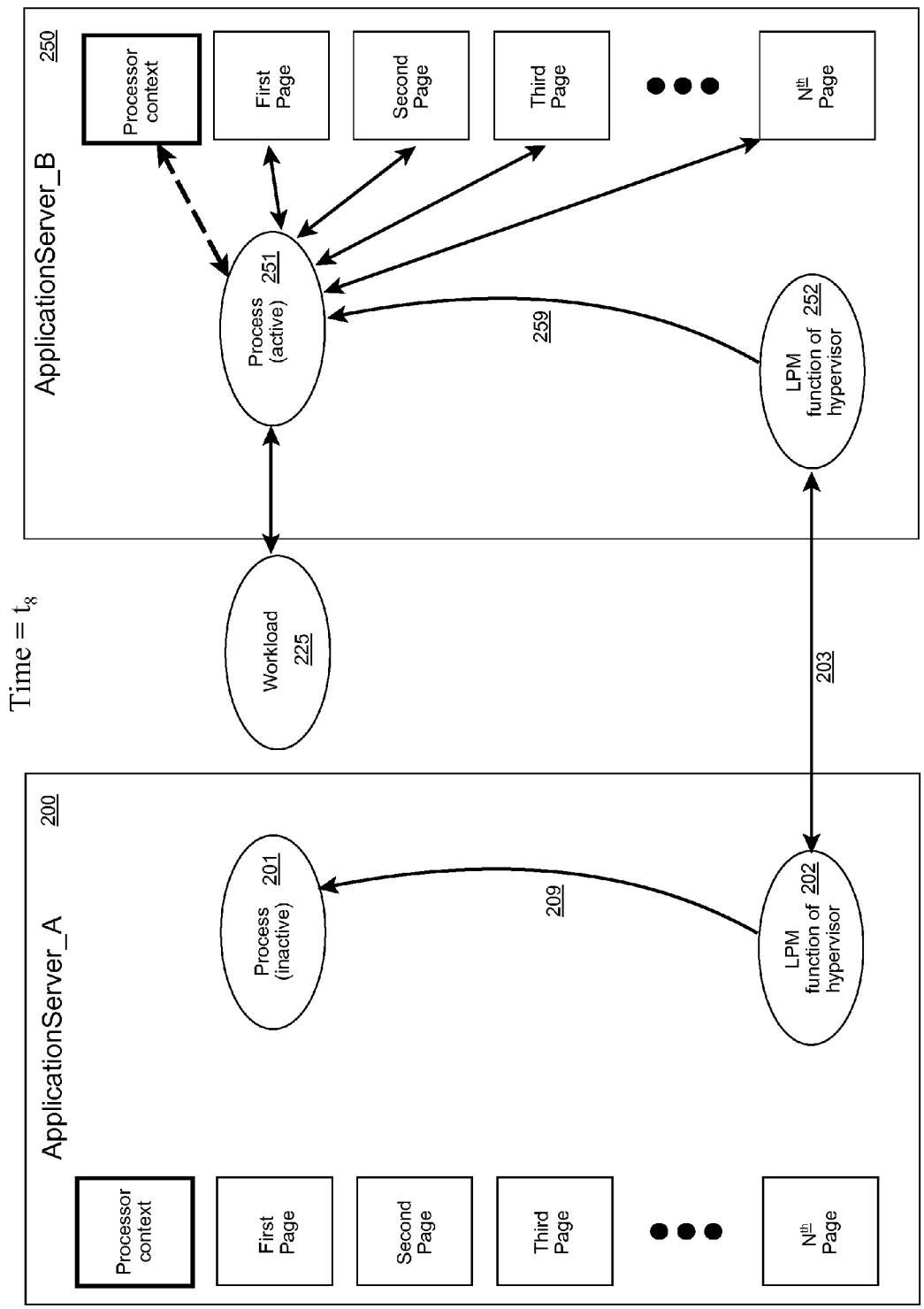
FIG. 9 illustrates cutover of the service from the source server to the destination server.
Figure 10:
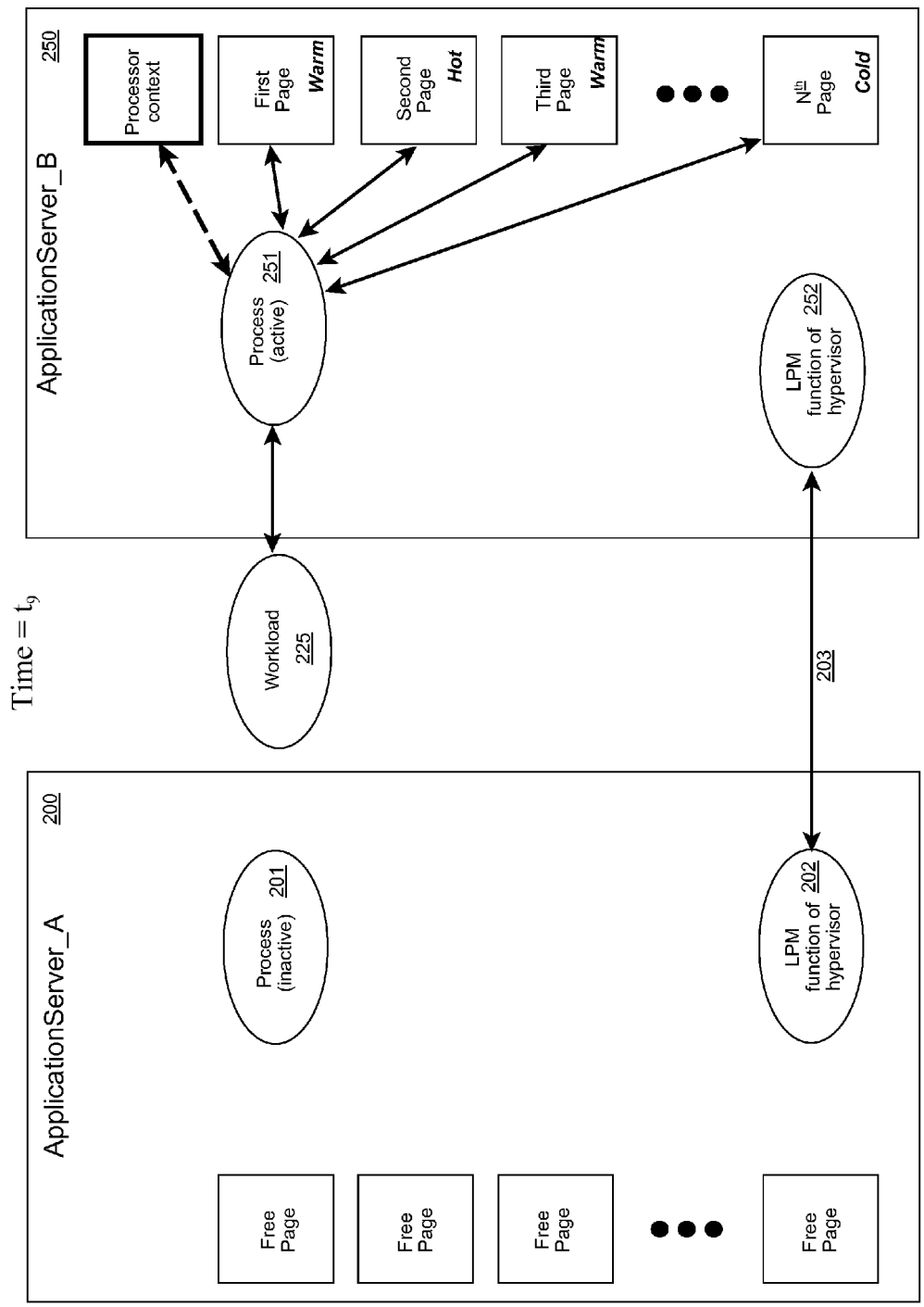
FIG. 10 shows the completion of the migration of the process from the source server to the destination server.
Figure 11:
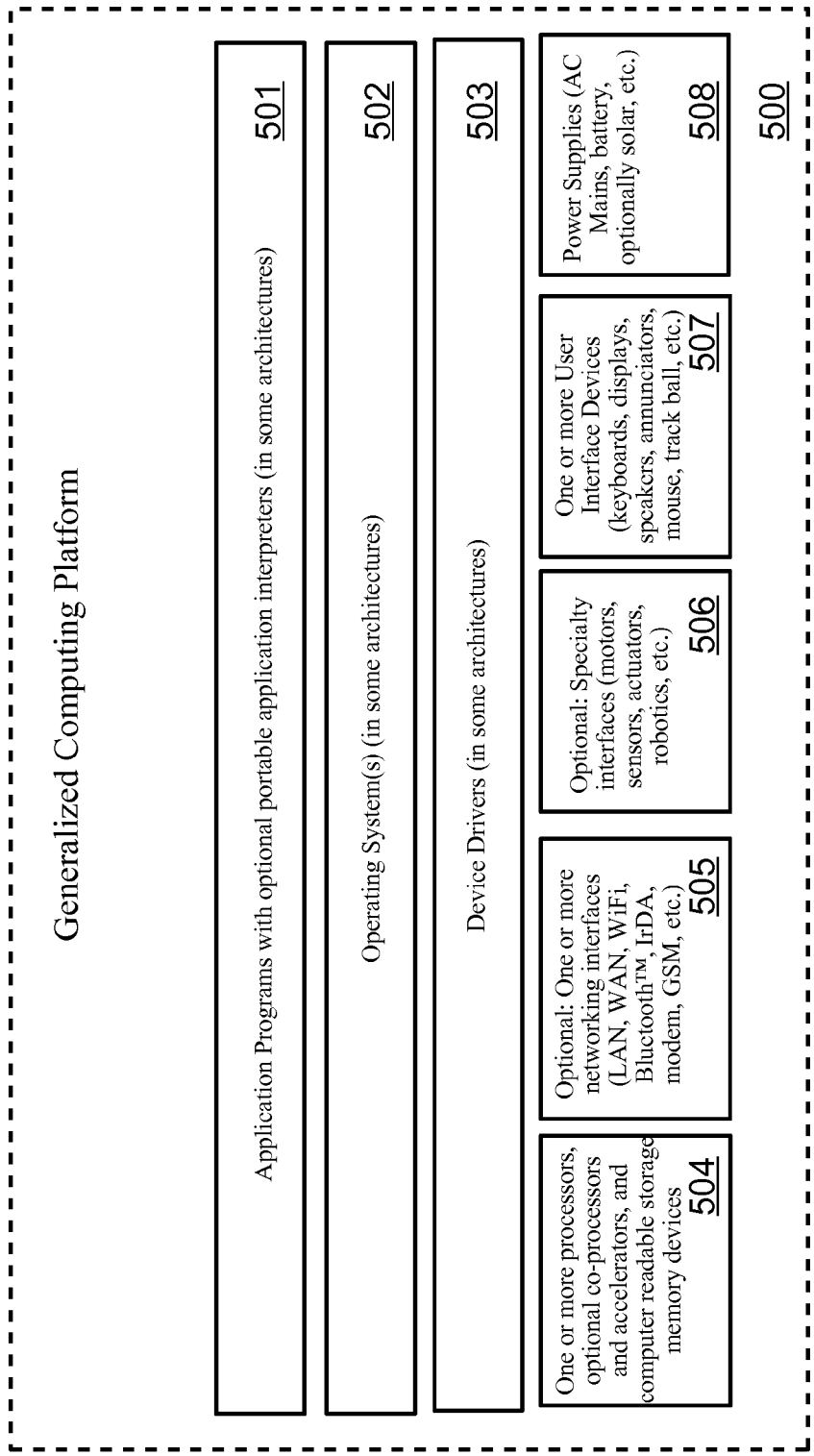
FIGS. 11 and 12 set forth a generalized architecture of computing platforms suitable for at least one embodiment of the present and the related inventions, the latter being more specific to platforms on which live partition migration may be readily implemented.

Continuing to FIG. 9, now that each of the pages that has been copied to the destination server is now clean and represents the current state of the corresponding pages on the source server, the context of the process on the source server is copied (#208 in FIG. 8), and the process instance on the destination server may be activated (259). The workload (225) is redirected to the destination server (250) to complete the migration. And, the process running on the source server may be deactivated (209). Finally, referring to FIG. 10, the pages on the source server (200) are released in reclaimed such that they might be used by other processes. This completes one illustrative example of the operation of an embodiment of the present invention.

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

One particular hardware embodiment for a computing system suitable for supporting life partition migration is an IBM™ POWER6 or POWER7 based computer system executing the PowerVM Enterprise Edition virtual I/O server with Hardware Management Console (HMC) and the Integrated Virtualization Manager (IVM). Other configurations of computing hardware may be equally suitable for executing software-based logical processes comprising hardware and software components from other suppliers may be utilized for variations of embodiments of the present invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

The present invention may be realized for many different processors used in many different computing platforms. F*ig*. 11 illustrates a generalized computing platform (500), such as common and well-known computing platforms such as "Personal Computers", web servers such as an IBM iSeries [TM] server, and portable devices such as personal digital assistants and smart phones, running a popular operating systems (502) such as Microsoft [TM] Windows [TM] or IBM [TM] AIX [TM], Palm OS [TM], Microsoft Windows Mobile [TM], UNIX, LINUX, Google Android [TM], Apple iPhone iOS [TM], and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Figure 12:
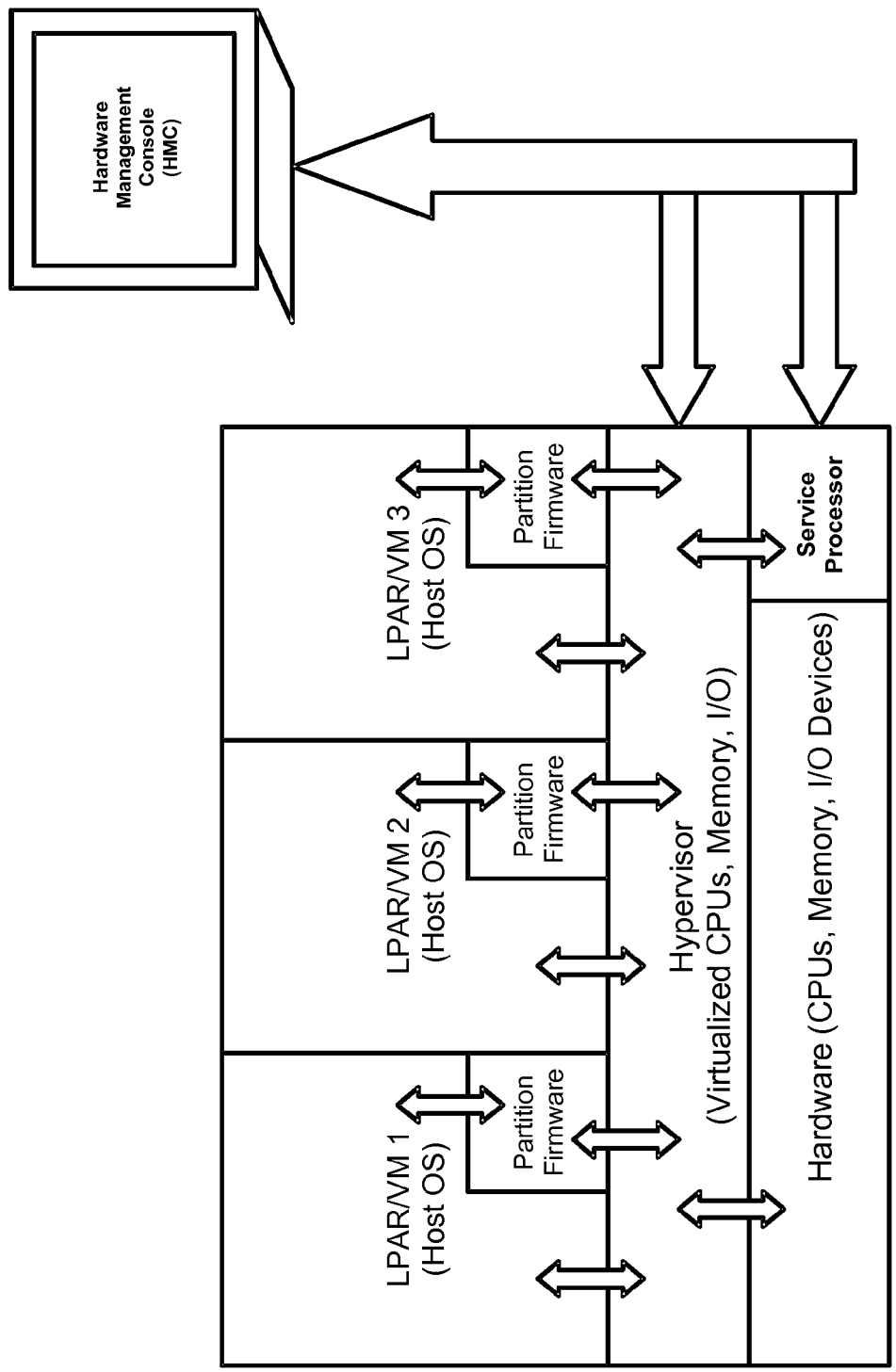

FIG. 12 shows a more specific, but still somewhat generalized, depiction of a computing platform suitable for live partition migration. This particular diagram represents the architecture of an IBM System P™ computing platform, which is suitable for running AIX and Linux operating systems and is based on the POWER7 microprocessor. This architecture includes the actual, non-virtual computing electronic hardware (CPUs, memory, input/output devices) such as that previously discussed, plus a hypervisor component where virtual CPU's, memory, and I/O are created and managed on behalf of the logical partitions (LPAR) virtual machines (VM). A service processor component allows administrative control of the LPAR/VM's via a hardware management console (HMC) in this particular configuration. Other suppliers of computing platforms such as HP™ and Oracle™ also provide suitable computing platforms for realization of embodiments of the present invention.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for reducing page faults during partition migration from a source computing system to a destination computing system comprising:
designating in a computer readable tangible storage memory device a frequency of use designation for each of a plurality of memory pages being used by a first instance of a computer process currently being executed on a source computing system, wherein the source computing system has a microprocessor;
responsive to a live partition migration event beginning, rank ordering the plurality of memory pages according to the frequency of use designations to create a sequence of copying during the migration event, wherein the rank order of each partition can take the state of hot and cold coupled with a type of access designation of read-only and read-write;
copying read-write pages from the source computing system to a destination computing system according to a sequence of cold to hot;
copying read-only pages from the source computing system to the destination computing system according to a sequence of hot to cold;
refreshing one or more partition copies on the destination computing system in which any pages which have been dirtied on the source computing system since the beginning of the migration event; and
responsive to all pages being copied and refreshed as applicable, transferring execution of the first instance of the computer process to a second instance of the computer process executing on the destination computing system, and redirecting workflow from the source computing system to the destination computing system associated with the computer process.

2. The method as set forth in claim 1 wherein the designation of frequency of use of each partition can further take a of warm, and wherein the copying sequence from hot pages to cold pages comprises copying warm pages after hot pages but before cold pages, and wherein the copying sequence from cold pages to warm pages comprises copying warm pages after cold pages but before warm pages.

3. The method as set forth in claim 1 wherein the designations for frequency of use of each partition are periodically updated by a most-recently used page management daemon component of the computing system.

4. The method as set forth in claim 1 further comprising, subsequent to the transferring of execution to the second instance of the computer process, releasing and reclaiming resources consumed by the copied partitions on the source computing system.

5. A computer program product for reducing page faults during partition migration from a source computing system to a destination computing system comprising:
a computer-readable, tangible storage memory device which is not a propagating signal per se; and
one or more program instructions embodied by the computer-readable, tangible storage memory device for causing a processor to perform operations comprising:
designating in a computer readable tangible storage memory device a frequency of use designation for each of a plurality of memory pages being used by a first instance of a computer process currently being executed on a source computing system, wherein the source computing system has a microprocessor;
responsive to a live partition migration event beginning, rank ordering the plurality of memory pages according to the frequency of use designations to create a sequence of copying during the migration event, wherein the rank order of each partition can take the state of hot and cold coupled with a type of access designation of read-only and read-write;
copying read-write pages from the source computing system to a destination computing system according to a scheduled order of cold to hot;
copying read-only pages from the source computing system to the destination computing system according to a scheduled order of hot to cold;
refreshing one or more partition copies on the destination computing system in which any pages which have been dirtied on the source computing system since the beginning of the migration event; and
responsive to all pages being copied and refreshed as applicable, transferring execution of the first instance of the computer process to a second instance of the computer process executing on the destination computing system, and redirecting workflow from the source computing system to the destination computing system associated with the computer process.

6. The computer program product as set forth in claim 5 the designation of frequency of use of each partition can further take a state of warm, and wherein the copying sequence from hot pages to cold pages comprises copying warm pages after hot pages but before cold pages, and wherein the copying sequence from cold pages to warm pages comprises copying warm pages after cold pages but before warm pages.

7. The computer program product as set forth in claim 5 wherein the designations for frequency of use of each partition are periodically updated by a most-recently used page management daemon component of the computing system.

8. The computer program product as set forth in claim 5 wherein the program instructions further comprise program instructions for, subsequent to the transferring of execution to the second instance of the computer process, releasing and reclaiming resources consumed by copied partitions on the source computing system.

9. A system for reducing page faults during partition migration from a source computing system to a destination computing system comprising:
- a processor for performing a logical process under the control of program instructions;
- a computer-readable, tangible storage memory device which is not a propagating signal per se; and
- one or more program instructions embodied by the computer-readable, tangible storage memory device for causing a processor to perform operations comprising:
  - designating in a computer readable tangible storage memory device a frequency of use designation for each of a plurality of memory pages being used by a first instance of a computer process currently being executed on a source computing system, wherein the source computing system has a microprocessor;
  - responsive to a live partition migration event beginning, rank ordering the plurality of memory pages according to the frequency of use designations to create a sequence of copying during the migration event, wherein the rank order of each partition can take the state of hot and cold coupled with a type of access designation of read-only and read-write;
  - copying read-write pages from the source computing system to a destination computing system according to a scheduled order of cold to hot;
  - copying read-only pages from the source computing system to the destination computing system according to a scheduled order of hot to cold;
  - refreshing one or more partition copies on the destination computing system in which any pages which have been dirtied on the source computing system since the beginning of the migration event; and
  - responsive to all pages being copied and refreshed as applicable, transferring execution of the first instance of the computer process to a second instance of the computer process executing on the destination computing system, and redirecting workflow from the source computing system to the destination computing system associated with the computer process.

10. The system as set forth in claim 9 wherein the designation of frequency of use can further take a state of warm, and wherein the copying sequence from hot pages to cold pages comprises copying warm pages after hot pages but before cold pages, and wherein the copying sequence from cold pages to warm pages comprises copying warm pages after cold pages but before warm pages.

11. The system as set forth in claim 9 wherein the designations for frequency of use of each partition are periodically updated by a most-recently used page management daemon component of the computing system.

12. The system as set forth in claim 9 wherein the program instructions further comprise, subsequent to the transferring of execution to the second instance of the computer process, releasing and reclaiming resources consumed by the copied partitions on the source computing system.

* * * * *